(12) United States Patent
Mayer-Rosa et al.

(10) Patent No.: US 8,937,251 B2
(45) Date of Patent: Jan. 20, 2015

(54) ELECTRIC CABLE FOR USE IN A WELDING DEVICE

(71) Applicant: Balluff GmbH, Neuhausen a.d.F. (DE)

(72) Inventors: Michael Mayer-Rosa, Neuhausen a.d.F. (DE); Thomas Bayer, Neuhausen a.d.F. (DE); Andreas Kammerer, Winnenden (DE)

(73) Assignee: Balluff GmbH, Neuhausen a.d.F. (DE)

( * ) Notice: Subject to any disclaimer, the term of this patent is extended or adjusted under 35 U.S.C. 154(b) by 0 days.

(21) Appl. No.: 14/048,124

(22) Filed: Oct. 8, 2013

(65) Prior Publication Data

US 2014/0291018 A1   Oct. 2, 2014

(30) Foreign Application Priority Data

Mar. 27, 2013   (DE) .................. 20 2013 002 912 U

(51) Int. Cl.
  *H01B 7/295*   (2006.01)
  *B23K 9/32*   (2006.01)
  *H01R 13/527*   (2006.01)
  *H01B 3/44*   (2006.01)

(52) U.S. Cl.
  CPC ...... *H01B 7/295* (2013.01); *B23K 9/32* (2013.01); *H01R 13/527* (2013.01); *H01B 3/445* (2013.01)
  USPC .................. 174/74 R; 174/110 R; 174/113 R

(58) Field of Classification Search
  CPC ............ H01B 7/295; H01B 3/18; H01B 3/46; H01R 11/26
  USPC ... 174/74 R, 75 R, 102 R, 103, 105 R, 113 R, 174/110 R
  See application file for complete search history.

(56) References Cited

U.S. PATENT DOCUMENTS

| | | | | |
|---|---|---|---|---|
| 3,823,255 A | * | 7/1974 | La Gase et al. ............ | 174/113 R |
| 4,150,249 A | * | 4/1979 | Pedersen ......................... | 174/36 |
| 4,547,626 A | * | 10/1985 | Pedersen et al. .............. | 174/107 |
| 4,659,871 A | * | 4/1987 | Smith et al. ............... | 174/113 R |
| 7,211,766 B2 | * | 5/2007 | Rehrig ....................... | 219/137.9 |

(Continued)

OTHER PUBLICATIONS

IEC 60332-2-2, Tests on electric and optical fibre cables under fire conditions—Part 2-2: Test for vertical flame propagation for a single small insulated wire or cable—Procedure for diffusion flame, First Edition, Jul. 2004, total of 36 pages.

(Continued)

*Primary Examiner* — Hoa C Nguyen
*Assistant Examiner* — Amol Patel
(74) *Attorney, Agent, or Firm* — Collard & Roe, P.C.

(57) ABSTRACT

An electric cable includes at least one power line having first and second ends, including multiple cores. Each core has a core insulation. All core insulations are enclosed by a common sheath. The core insulations and the sheath each include a material which is selected, independently of one another, from silicones, perfluorocarbons, cross-linked polyolefins, mica, glass fibers, ceramic fibers, and mixtures thereof. A first plug connector is arranged on the first end of the power line, and at least one second plug connector is arranged on the second end of the power line. The plug connectors each include a flame retardant containing polyurethane. A first connecting nut is arranged on the first plug connector, and at least one second connecting nut is arranged on the second plug connector. The connecting nuts each include a perfluorocarbon. A method uses the electric cable as a control line for a welding device.

11 Claims, 2 Drawing Sheets

(56) References Cited

U.S. PATENT DOCUMENTS

| | | | |
|---|---|---|---|
| 7,247,797 B2* | 7/2007 | Buthe et al. | 174/110 R |
| 7,378,595 B2* | 5/2008 | Brambilla | 174/113 R |
| 7,511,245 B2* | 3/2009 | Hsu | 219/98 |
| 2007/0087637 A1* | 4/2007 | Zart et al. | 439/736 |
| 2009/0056974 A1* | 3/2009 | Groegl et al. | 174/113 R |
| 2013/0206463 A1* | 8/2013 | Boday et al. | 174/258 |

OTHER PUBLICATIONS

DIN ISO 7619-1, Rubber, vulcanized or thermoplastic—Determination of indentation hardness—Part 1: Durometer method (Shore hardness) (ISO 7619-1:2010), Feb. 2012, total of 17 pages.

DIN EN 7619-2, Rubber, vulcanized or thermoplastic—Determination of indentation hardness—Part 2: IRHD pocket meter method (ISO 7619-2:2010), Feb. 2012, total of 10 pages.

ISO 868, Plastics and ebonite—Determination of indentation hardness by means of a durometer (Shore hardness), Mar. 1, 2003, total of 12 pages.

English translation of DIN 53504, Testing of rubber—Determination of tensile strength at break, tensile stress at yield, elongation at break and stress values in a tensile test, Oct. 2009, total of 18 pages.

DIN ISO 34-1, Rubber, vulcanized or thermoplastic—Determination of tear strength, Part 1: Trouser, angle and crescent test pieces, Jul. 2004, total of 14 pages. (and also DIN ISO 34-1, Jul. 2005, Correction to DIN ISO 34-1:2004-07, 2 pages).

English translation of DIN ISO 4649, Rubber, vulcanized or thermoplastic—Determination of abrasion resistance using a rotating cylindrical drum device, Nov. 2006, total of 20 pages.

English translation of DIN EN ISO 179-1, Plastics—Determination of Charpy impact properties—Part 1: Non-instrumented impact test, Nov. 2010, total of 29 pages.

English translation of DIN EN 13602, Copper and copper alloys—Drawn, round copper wire for the manufacture of electrical conductors, Sep. 2013, total of 24 pages.

CEI IEC 60529, Degrees of protection provided by enclosures (IP Code), Edition 2.1, Feb. 2001, total of 102 pages, with Correction 1 dated Jan. 2003 and Correction 2 dated Oct. 2007.

ISO 7619-1, Rubber, vulcanized or thermoplastic—Determination of indentation hardness—Part 1: Durometer method (Shore hardness), Second edition, Oct. 1, 2010, total of 20 pages.

\* cited by examiner

ELECTRIC CABLE FOR USE IN A WELDING DEVICE

CROSS REFERENCE TO RELATED APPLICATIONS

Applicant claims priority under 35 U.S.C. §119 of German Application No. 20 2013 002 912.9 filed Mar. 27, 2013, the disclosure of which is incorporated by reference.

BACKGROUND OF THE INVENTION

1. Field of the Invention

The present invention relates to an electric cable. Furthermore, the invention relates to the use of the electric cable as a control line for a welding device.

2. Prior Art

Welding devices, in particular welding robots for automated industrial applications, require for their control electric cables which can withstand high stresses. It is required that such electric cables are to be flame resistant according to different standards such as IEC 60332-2, VDE 0482-265-2-2, and EN 50265-2-2. In addition, they must be able to withstand the contact with welding beads, i.e., the metal which melts and sprays during the welding, over a long period of time.

Currently known electric cables, which are used in welding devices, must be regularly replaced, since cable cores are exposed very often due to the rough conditions during welding. It is therefore the object of the present invention to provide an electric cable that has a particularly high resistance with respect to welding conditions and which can be used as a control line for a welding device.

SUMMARY OF THE INVENTION

This object is achieved by the electric cable according to the invention. It comprises at least one power line having a first end and a second end, comprising multiple cores, wherein each core has a core insulation and all core insulations are enclosed by a common sheath, and wherein the core insulations and the sheath each comprise a material, which are selected independently of one another, from the group consisting of silicones, perfluorocarbons, cross-linked polyolefins, mica, glass fibers, ceramic fibers, and mixtures thereof, a first plug connector, which is arranged on the first end of the power line, and at least one second plug connector, which is arranged on the second end of the power line, wherein the plug connectors each comprise a polyurethane (PU), which contains a flame retardant, and a first connecting nut, which is arranged on the first plug connector, and at least one second connecting nut, which is arranged on a second plug connector, wherein the connecting nuts each comprise a perfluorocarbon. The combination of materials according to the invention results in an extraordinarily high resistance of the electric cable with respect to the conditions of welding use. Therefore, it is suitable in particular for use as a control line for a welding device.

The power line comprises at least two cores and preferably four cores. It can thus be connected as a polar-rectified cable, in which the magnetic fields of the four cores partially compensate for one another. The cores each consist in particular of tin-plated copper.

An electrical shield can optionally be arranged between the core insulations and the sheath. This shield preferably consists of metal fibers, particularly preferably of nickel fibers.

The materials of the core insulations and the sheath are in particular selected independently from one another from the group consisting of silicones, perfluorocarbons, and mixtures thereof. The core insulations and the sheath preferably consist of the same material. This allows uniform behavior of the core insulations and the sheath in the event of thermal strain.

In order to ensure a high welding bead resistance of the sheath, it preferably contains a flame retardant. A halogen-free flame retardant is particularly preferred in this case, which results in a particularly high resistance of the sheath. Furthermore, the sheath can optionally be impregnated with a silicone.

The silicones are in particular fluorosilicones and/or the copolymers thereof.

Perfluorocarbons are understood according to the invention in particular as perfluoroalkanes, perfluorocoalkylenes, perfluoroalkoxypolymers, and copolymers of methacrylates and perfluoroalkyacrylates. Polytetrafluoroethylene (PTFE), perfluoro-ethylenepropylene (FEP), and mixtures thereof are preferred.

The cross-linked polyolefins are in particular cross-linked polyethylenes.

The plug connectors preferably comprise a polyurethane which is based on a polyester, a polyether, or a polyester ether as a polyol. Among these, a polyether is particularly preferred. The flame retardant in the material of the plug connector is in particular a halogen-free flame retardant. Furthermore, it is preferable for the plug connectors to each consist of a material which has a hardness of at least Shore 54D according to the standards DIN 53505 and ISO 868. The tensile strength of the material is preferably at least 28 MPa according to DIN 53504. Its ultimate elongation is preferably at least 380% according to DIN 53504. Its tear resistance is preferably at least 100 N/mm according to DIN ISO 34-1Bb. Its abrasion is preferably at most 25 $mm^3$ according to DIN ISO 4649-A. Its notched impact strength (Charpy) at +23° C. is preferably at least 45 $kJ/m^2$ according to DIN EN ISO 179.

BRIEF DESCRIPTION OF THE DRAWINGS

Exemplary embodiments of the invention are illustrated in the drawings and explained in greater detail in the following description.

EXEMPLARY EMBODIMENTS OF THE INVENTION

Figure 1:
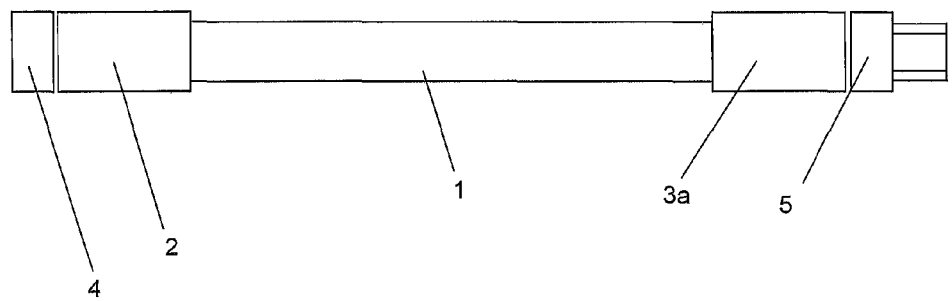
FIG. 1 shows a side view of an electric cable according to one embodiment of the invention.
Figure 2:
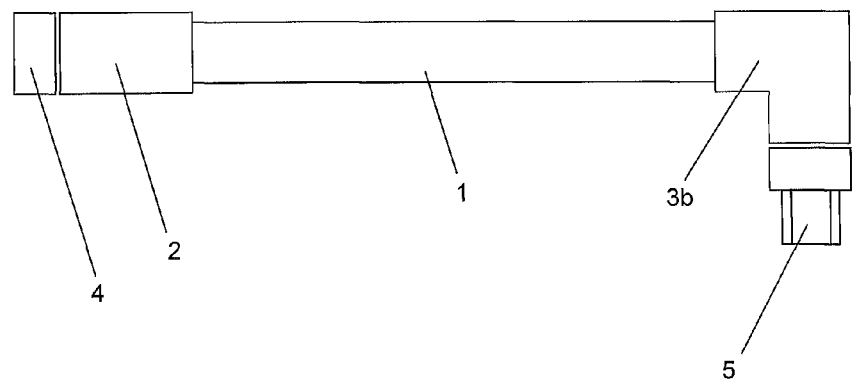
FIG. 2 shows a side view of an electric cable according to another embodiment of the invention.
Figure 3:
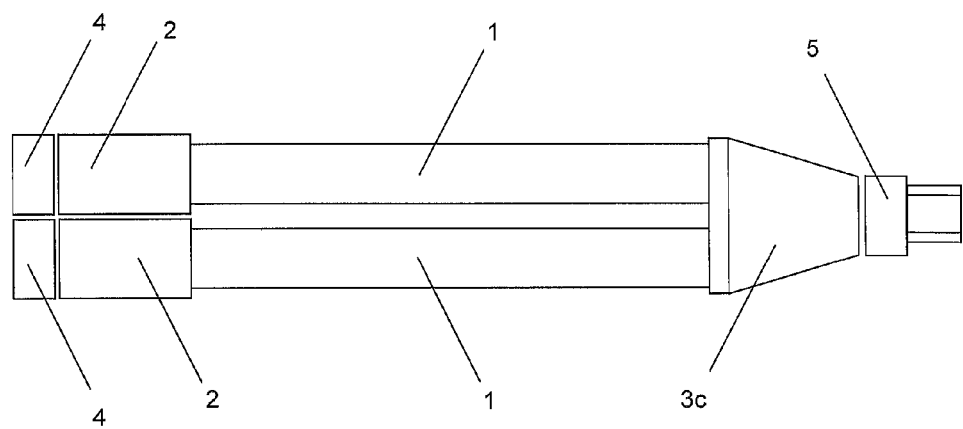
FIG. 3 shows a side view of an electric cable according to still another embodiment of the invention.
Figure 4:
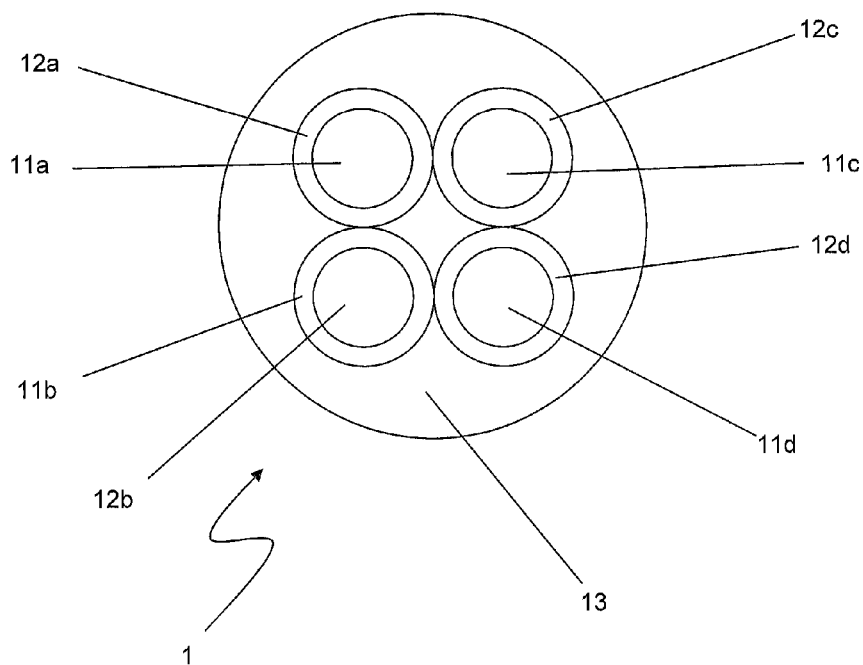
FIG. 4 shows a longitudinal section through the power line of an electric cable according to one embodiment of the invention.

The resistance of cables with respect to welding conditions was studied in comparative examples (VB1 to VB7) and examples according to the invention (B1 and B2) of electric cables. The construction of such an electric cable is shown in three embodiments in FIGS. 1, 2, and 3. FIG. 4 shows a longitudinal section through the power line 1 of this electric cable. The power line 1 comprises four cores 11a, 11b, 11c, 11d. Each core 11a, 11b, 11c, 11d has a core insulation 12a, 12b, 12c, 12d. All core insulations 12a, 12b, 12c, 12d are enclosed by a common sheath 13. A first plug connector 2 is arranged at the first end of the power line 1. A second plug connector 3a, 3b, 3c is arranged at the second end of the power line. The second plug connector can be embodied as a linear plug connector 3a, as an angled plug connector 3b, or as a Y-plug connector 3c. The plug connectors 2, 3a, 3b, 3c are each crimped onto the power line 1. A first connecting nut 4 is arranged on the first plug connector 2. A second connecting nut 5 is arranged on the second plug connector 3a, 3b, 3c.

The cores 11a, 11b, 11c, 11d consisted in all examples of tin-plated copper and had a cross-sectional area of 0.34 mm² each. The materials M 12 of the core insulations 12a, 12b, 12c, 12d, the materials M13 of the sheaths 13, the materials M2/3 of the plug connectors 2, 3a, 3b, 3c, and the materials M4/5 of the connecting nuts 4, 5 are listed in Table 1:

TABLE 1

| # | M12 | M13 | M2/3 | M4/5 | Resistant |
|---|---|---|---|---|---|
| VB1 | PVC | PVC | PU + flame retardant | PTFE | no |
| VB2 | PVC | TPE-E | PU + flame retardant | PTFE | no |
| VB3 | PP | PU | PU + flame retardant | PTFE | no |
| VB4 | PTFE | PTFE | PVC | PTFE | no |
| VB5 | silicone | silicone | PVC | PTFE | no |
| VB6 | PTFE | PTFE | PU + flame retardant | steel | no |
| VB7 | silicone | silicone | PU + flame retardant | steel | no |
| B1 | PTFE | PTFE | PU + flame retardant | PTFE | yes |
| B2 | silicone | silicone | PU + flame retardant | PTFE | yes |

Therein, PVC stands for polyvinylchloride, PP for polypropylene, PTFE for polytetrafluoroethylene, PU for polyurethane, and TPE-E for a thermoplastic polyester elastomer.

PVC Y17 (hardness Shore 90-95 A) was used as a PVC for the core insulation. PVC YM3 (hardness Shore AB0-B5) was used as a PVC for the sheath. PP9Y (hardness Shore 54D) was used as a polypropylene. TPU 11YH1 (hardness Shore 54D) was used as a polyurethane for the sheath. Elastollan 11 54 D FHF (hardness Shore 58D, tensile strength 30 MPa, elongation at tear 400%, tear resistance 110 N/mm, abrasion 30 mm³, notched impact strength (Charpy) 50 kJ/m² at +23° C.) from BASF, Ludwigshafen, Germany was used as a polyurethane+flame retardant for the plug connectors 2, 3a, 3b. In the examples B1 and B2 according to the invention, cables from Berger Spezialkabel, Henstedt-Ulzburg, Germany were used as the power line 1.

All studied cables were used as a control line in a welding device known per se in 62,200 successive welding cycles. Only the electric cables according to the invention of the examples B1 and B2 withstood these experimental conditions without at least one of the cores being exposed. Therefore, these have a particularly high resistance with respect to welding conditions.

What is claimed is:

1. An electric cable, comprising
at least one power line (1) having a first end and a second end, comprising multiple cores (11a, 11b, 11c, 11d), wherein each core (11a, 11b, 11c, 11d) has a core insulation (12a, 12b, 12c, 12d) and all core insulations (12a, 12b, 12c, 12d) are enclosed by a common sheath (13), and wherein the core insulations (12a, 12b, 12c, 12d) and the sheath (13) each comprise a material which is selected, independently of one another, from the group consisting of silicones, perfluorocarbons, cross-linked polyolefins, mica, glass fibers, ceramic fibers, and mixtures thereof,
a first plug connector (2), which is arranged on the first end of the power line (1), and at least one second plug connector (3a, 3b), which is arranged on the second end of the power line, wherein the plug connectors (2, 3a, 3b) each comprise a polyurethane that contains a flame retardant, and
a first connecting nut (4), which is arranged on the first plug connector (2), and at least one second connecting nut (5), which is arranged on the second plug connector (3a, 3b), wherein the connecting nuts each comprise a perfluorocarbon.

2. The electric cable according to claim 1, wherein the core insulations (12a, 12b, 12c, 12d) and the sheath (13) comprise the same material.

3. The electric cable according to claim 1, wherein the sheath (13) contains a flame retardant.

4. The electric cable according to claim 1, wherein the core insulations and the sheath each comprise fluorosilicones and/or the copolymers thereof.

5. The electric cable according to claim 1, wherein the core insulations and the sheath each comprise perfluorocarbons selected from the group consisting of polytetrafluoroethylene, perfluoroethylenepropylene, and mixtures thereof.

6. The electric cable according to claim 1, wherein the polyurethane is based on a polyester, a polyether, or a polyester ether.

7. The electric cable according to claim 1, wherein the flame retardant in the material of the plug connector (2, 3a, 3b) is a halogen-free flame retardant.

8. The electric cable according to claim 1, wherein the plug connectors (2, 3a, 3b) each comprise a material which has a hardness of at least Shore 54D.

9. The electric cable according to claim 1, wherein the power line (1) comprises four cores (11a, 11b, 11c, 11d).

10. The electric cable according claim 1, wherein the cores (11a, 11b, 11c, 11d) each comprise tin-plated copper.

11. A method of use of an electric cable according to claim 1 as a control line for a welding device.

* * * * *